(12) United States Patent
Muench

(10) Patent No.: US 11,987,120 B2
(45) Date of Patent: *May 21, 2024

(54) SPEED CONTROL OF A HARVESTER

(71) Applicant: Deere & Company, Moline, IL (US)

(72) Inventor: Philipp Muench, Kaiserslautern (DE)

(73) Assignee: Deere & Company, Moline, IL (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/387,691

(22) Filed: Jul. 28, 2021

(65) Prior Publication Data

US 2022/0024310 A1    Jan. 27, 2022

Related U.S. Application Data

(63) Continuation of application No. 15/820,616, filed on Nov. 22, 2017, now Pat. No. 11,091,034.

(30) Foreign Application Priority Data

Nov. 23, 2016  (DE) .......................... 102016223133.2

(51) Int. Cl.
  *B60K 31/00* (2006.01)
  *A01D 41/127* (2006.01)
  *A01D 69/03* (2006.01)

(52) U.S. Cl.
  CPC .......... *B60K 31/00* (2013.01); *A01D 41/1274* (2013.01); *A01D 69/03* (2013.01)

(58) Field of Classification Search
  None
  See application file for complete search history.

(56) References Cited

U.S. PATENT DOCUMENTS

| 4,658,787 | A | 4/1987 | Takizawa |
| 6,067,801 | A | 5/2000 | Harada et al. |
| 6,094,617 | A * | 7/2000 | Lapke ................. F02D 41/1497 340/439 |
| 9,179,600 | B2 | 11/2015 | Kraus |

(Continued)

FOREIGN PATENT DOCUMENTS

| DE | 19921466 A1 | 11/2000 |
| EP | 1243173 A1 | 9/2002 |

(Continued)

OTHER PUBLICATIONS

European Patent Office, "Extended European Search Report" issued in connection with European Patent Application No. 17198783.7, dated Apr. 18, 2019, 16 pages (English Machine Translation Included).

(Continued)

*Primary Examiner* — Thomas E Worden
(74) *Attorney, Agent, or Firm* — HANLEY, FLIGHT & ZIMMERMAN, LLC

(57) ABSTRACT

An arrangement for control of the drive speed of a harvester comprises an internal control loop for control of the drive speed of the harvester, to which can be sent a set value and an actual value of a throughput-dependent parameter, and also an external control loop to make available the set value of the throughput-dependent parameter for the internal control loop, to which set and actual values regarding the power output of a drive of the harvester can be sent as input parameters.

25 Claims, 2 Drawing Sheets

(56) References Cited

U.S. PATENT DOCUMENTS

| | | |
|---|---|---|
| 2011/0106398 A1 | 5/2011 | Ikeda et al. |
| 2011/0106399 A1 | 5/2011 | Asano et al. |
| 2011/0106400 A1 | 5/2011 | Takashima et al. |
| 2011/0106408 A1 | 5/2011 | Morimoto et al. |
| 2013/0218383 A1 | 8/2013 | Martin |
| 2014/0059988 A1* | 3/2014 | Diekhans ............ A01D 43/085 56/10.2 A |
| 2014/0338298 A1* | 11/2014 | Jung ................ A01D 41/1274 56/10.2 R |
| 2015/0307081 A1 | 10/2015 | West et al. |
| 2017/0088115 A1 | 3/2017 | Kaneko et al. |

FOREIGN PATENT DOCUMENTS

| | | |
|---|---|---|
| EP | 2057880 A2 | 5/2009 |
| EP | 2253822 A2 | 11/2010 |
| EP | 2832205 A1 | 2/2015 |

OTHER PUBLICATIONS

United States Patent and Trademark Office, "Non-Final Office Action," issued in connection with U.S. Appl. No. 15/820,616, dated Jan. 21, 2020, 20 pages.

United States Patent and Trademark Office, "Final Office Action," issued in connection with U.S. Appl. No. 15/820,616, dated Jul. 10, 2020, 28 pages.

United States Patent and Trademark Office, "Notice of Allowance," issued in connection with U.S. Appl. No. 15/820,616, dated Apr. 8, 2021, 12 pages.

\* cited by examiner

1

SPEED CONTROL OF A HARVESTER

RELATED APPLICATIONS

This patent arises from a continuation of U.S. patent application Ser. No. 15/820,616, Filed Nov. 22, 2017, which claims priority to German Patent Application No. 102016223133.2, filed on Nov. 23, 2016, both of which are hereby incorporated by reference in their entireties. Priority to U.S. patent application Ser. No. 15/820,616, and German Patent Application No. 102016223133.2 is hereby claimed.

TECHNICAL FIELD

The present disclosure concerns a system for control of the drive speed of a harvester comprising a controller configured to adjust drive speed of the harvester.

BACKGROUND

Agricultural harvesters serve to harvest plants from a field. As a rule, processes are present in the harvester to treat the crop for purposes of subsequent further processing. Thus, the crop is chopped in a field chopper, and threshed, separated, and cleaned in a thresher. Drive of the harvester takes place through a drive motor, which is usually a (diesel) combustion engine. The drive motor drives the ground engagement means (wheels or tracks) of the harvester via a first drive train, and the crop processing and/or conveyor means of the harvester via a second drive train.

To ensure an at least approximately optimum utilization of the harvester, it has been proposed to register a representative parameter for the relevant crop throughput and to control the drive speed of the harvester by varying the transmission ratio of the first drive train so as to maintain a desired crop throughput.

In this regard, one is referred to European Patent Application No. EP 1 243 173 A1, which describes a thresher with a hydrostatic first drive train. The relevant throughput is registered by means of the drive torque of an axial threshing and separating rotor, and the drive speed is automatically controlled so that the drive torque corresponds to a preset value. Said preset value is input (calibrated) by an operator in that he selects a desired loss rate. Furthermore, the moisture content of the crop can be registered and taken into account in establishing the drive speed, i.e., the thresher travels more slowly in the case of wet (and thus more difficult to process) crop than in the case of dry crop.

It was proposed in a similar system that the operator input a desired crop pickup rate and control the control of the drive motor rotary speed so as to maintain a desired throughput (European Patent Application No. EP 2 057 880 A2). Further, European Patent Application No. EP 2 832 205 A1 proposes that the operator can input not only a desired throughput, but also an operating point of the drive motor. The control system thus controls not only the drive speed, but also the drive motor, in order to meet both requirements.

Previously, a value that corresponds to a desired throughput of crop per unit of time is inputted or selected by the operator. A measurement value concerning the actual throughput is sent to a control system, in order to generate a control signal for specification of the drive speed, which serves to drive the harvester directly (European Patent Application No. EP 1243 173 A1, European Patent Application No. EP 2 382 205 A1) or to control a drive train actuator that controls the drive speed via an internal speed control circuit (European Patent Application No. EP 2 057 880 A2).

It is to be seen as disadvantageous in this case that a specification of a set value for the crop throughput is relatively difficult, especially for less experienced operators. In many cases this leads to the specification of set values that are too low, so that the power output of the harvester is utilized only partly, or the set values being too high, which can lead to blockages.

This present disclosure has set the aim of at least partly avoiding said disadvantages.

SUMMARY

Various aspects of examples of the present disclosure are set forth in the claims. In one example, a system for controlling the drive speed of a harvester comprises a controller configured to adjust drive speed of the harvester. An (external) control loop is provided for making available a specification to the drive speed controller of the harvester, to which set and actual values concerning the power output of a drive of the harvester can be sent as input parameters. In another example, a harvester comprises a drive for powering the harvester and a drive speed controller configured to control the drive. The drive speed controller includes an external controller receiving set and actual values of the power output of the drive of the harvester and generating a set value of a throughput-dependent parameter. The drive speed controller further including an internal controller configured to control the drive speed of the drive using in part the set value of the throughput-dependent parameter and an actual value of the throughput-dependent parameter.

In yet another example, a method for controlling the drive of a harvester comprising providing a drive control loop configured with at least an external control loop and an internal control loop and generating, with the external control loop, a set value of a throughput-dependent parameter using in part the difference between a set value of the power output of the drive and an actual value of the power output of the drive. Sending the set value of a throughput-dependent parameter and an actual value of a throughput-dependent parameter to the internal control loop and controlling, using the internal control loop, the drive of the harvester using in part the set value of a throughput-dependent parameter and an actual value of a throughput-dependent parameter.

BRIEF DESCRIPTION OF THE DRAWINGS

The detailed description of the drawings refers to the accompanying figures in which.

DETAILED DESCRIPTION

Figure 1:
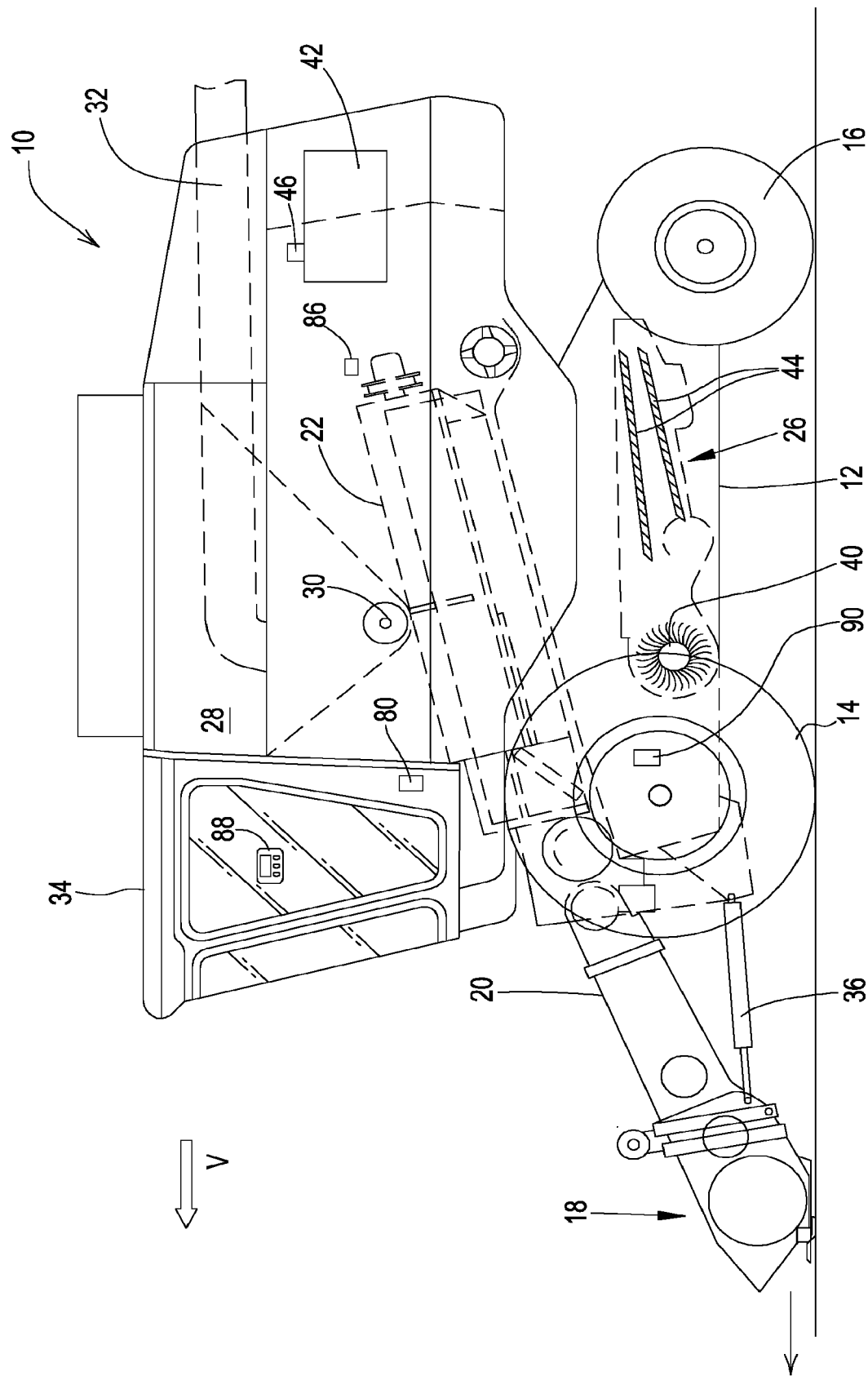
FIG. 1 shows a schematic side view of an agricultural harvester in the form of a thresher.

Referring now to FIG. 1, a self-propelled harvester 10 is shown in the form of a thresher with a chassis 12, which is supported on the ground by driven front wheels 14 and steerable rear wheels 16, and is moved forward by said wheels. The wheels 14, 16 are set into rotation by the drive shown in FIG. 2 in order to move the harvester 10, for example, over a field that is to be harvested. Below, directional data such as forward and reverse refer to the driving direction V of the harvester 10 in harvesting operation, which runs to the left in FIG. 1.

A harvesting header 18 in the form of a cutter unit is detachably connected at the front end region of the harvester 10, in order to harvest, in harvesting operation, crop in the form of cereals or other threshable grains from the field and to feed it upward and to the rear through an inclined conveyor assembly 20 to an axial threshing unit 22. The mixture, which contains grain and contaminants, passes through concave baskets and sieves in the axial threshing unit 22 and goes to a cleaning unit 26. Grain cleaned by the cleaning unit 26 is fed by a grain auger to a grain elevator, which transports it to a grain tank 28. The cleaned grain from the grain tank 28 can be offloaded through an offloading system having a transverse auger 30 and an offloading conveyor 32. Said systems are driven by a combustion engine 42, to which is assigned a motor control unit 46 and which is controlled and steered by an operator from operator's cabin 34, for which an operator interface 88 is provided.

Figure 2:
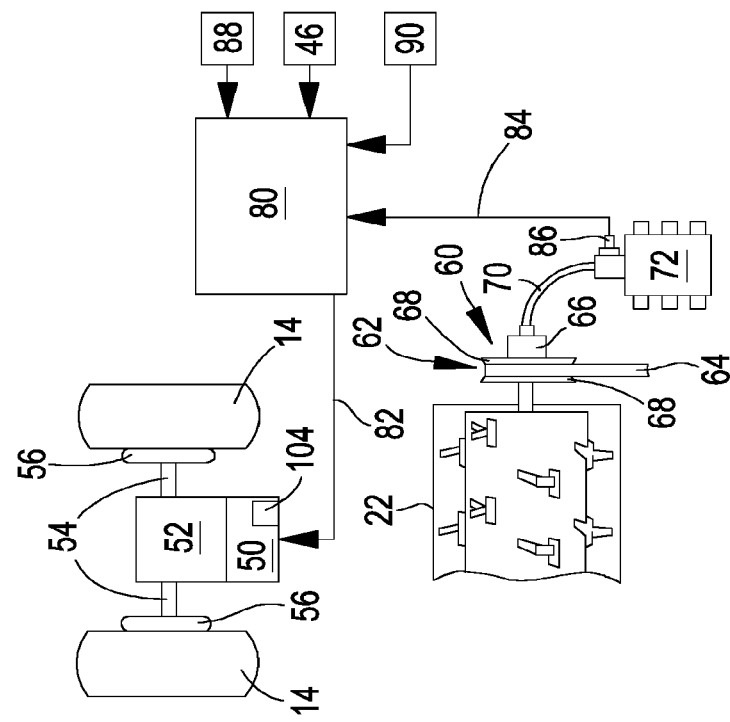
FIG. 2 shows a schematic drawing of an arrangement for control of the drive speed of the harvester of FIG. 1.

Reference is now made to FIG. 2. The front wheels 14 of the harvester 10 are driven through a hydrostatic transmission 50. The hydrostatic transmission 50 is driven in the conventional way by the combustion engine 42. The hydrostatic transmission 50 in turn drives a manual transmission 52. Two drive shafts 54 extend from manual transmission 52 outward and drive final drives 56 of the front wheels 14. The hydrostatic transmission 50 comprises a pump unit and a motor unit, where the pump unit could also be disposed at a distance from the motor unit. The pump unit and/or the motor unit are equipped with adjustable wobble plates. The adjustable wobble plates control the output speed of transmission 50 and its direction of rotation. Electromagnetically controlled control valves 104 control the positions of the wobble plates. The steerable rear wheels 16 can also be driven by wheel motors, which are mounted directly on the wheels 16. The speed of the wheel motors can likewise be controlled through the throughput control system described below.

An adjustable drive 60 with variable torque drives the rotor of the axial threshing unit 22. The same combustion engine 42, which also drives the hydrostatic transmission 50, also drives the adjustable drive 60. The adjustable drive 60 is a belt drive, which comprises a driven pulley wheel with variable diameter (not shown) and a driven pulley wheel 62 with variable diameter. A belt 64 stretches between the driven pulley wheel and the driven pulley wheel 62 in order to transmit rotary power. Hydraulic cylinders control the diameter of the pulley wheels. The hydraulic cylinder 66 is coupled to the driven pulley wheel 62 and moves the face plate 68 of the pulley wheel 62 inward or outward so as to control the effective diameter of the pulley wheel 62 with respect to the belt 64. By changing the effective diameter of the pulley wheels, the effective speed of the driven pulley wheel 62 is changed. Hydraulic fluid under pressure is sent by a valve assembly 72 to the hydraulic cylinder 66 through a hydraulic line 70. The rotor of the axial threshing unit 22 is driven at a constant, selected rotor speed by the variable diameter pulley wheels. The torque transmitted by belt 64 and the pulley wheels varies with the material throughput.

An electronic control unit 80 controls the drive and thus the harvesting speed of the harvester 10. This means that the electronic control unit 80 sets the forward speed (harvesting speed) of the thresher 10 through an adjustment of the position of the wobble plates of the hydrostatic transmission 50, by controlling the operation of the electromagnetically actuated control valves 104 via a line 82. The control unit 80 receives a current hydraulic pressure signal from a hydraulic pressure sensor 86 via line 84. The hydraulic pressure sensor 86 senses the hydraulic pressure of the hydraulic cylinder 66, which adjusts the variable torque drive 60. It has been found that the hydraulic pressure with which the hydraulic cylinder 66 adjusts the drive 60 is unambiguously related to the throughput. Accordingly, the control unit 80 is provided, via line 84, with a signal that contains information regarding the actual crop throughput of the harvester 10. Moreover, the control unit 80 receives signals concerning the actual drive speed V of the harvester 10 from a speed sensor 90. The speed sensor 90 can, for example as a radar sensor, register the speed of the harvester 10 with respect to the ground, or can register the speed of rotation of one of the front wheels 14. Also, the control unit 80 is sent a signal regarding the power output in each case by the combustion engine 42, which signal can be made available by the motor control unit 46 and can be based on its fuel consumption and/or a torque measurement at the crankshaft of the combustion engine 42. The operator interface 88 is also connected to the control unit 80.

Figure 3:
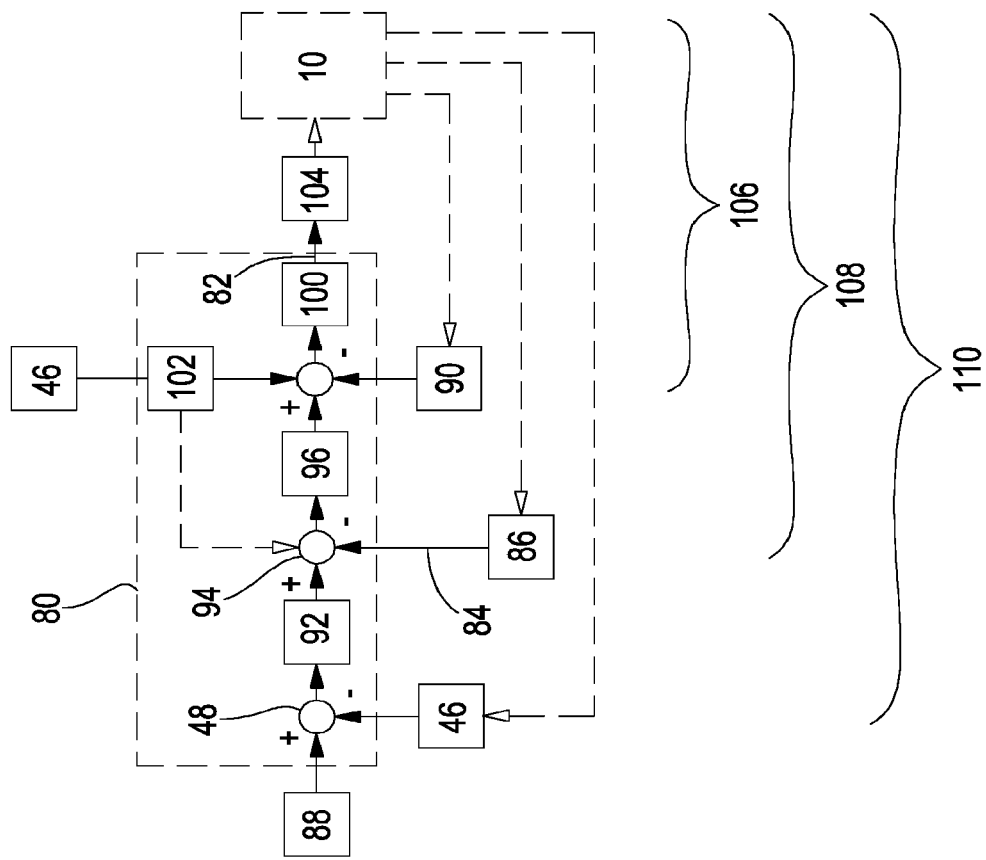
FIG. 3 shows a detailed diagram of the control of the arrangement in FIG. 2.

FIG. 3 shows the structure of the control unit 80 in detail. The control unit 80 can operate as an analog or digital device. It comprises a first subtractor 48, to which is sent as positive input value an input from the operator interface 88, which defines a set value of the power output of the combustion engine 42. Said set value can be entered in absolute numbers (power output in kW) or as a percentage of a maximum power output or a rated power output.

Referring again to FIG. 3 in greater detail, the first subtractor 48 receives, as negative input value, the actual power output by combustion engine 42. The difference of set value and actual value of the power output of the internal combustion engine 42 is sent by the first subtractor 48 to an external controller 92, which can be designed in a substantially known way as a PID controller. The external controller 92 outputs, as output value, a set value for the crop throughput, which, in the embodiment shown, is represented by the pressure of the hydraulic cylinder 66, which is measured with the hydraulic pressure sensor 86.

The set value for the crop throughput is sent from the output of the external controller 92 as a positive input value to a second subtractor 94, to which is sent, as negative input value, the signal of the hydraulic pressure sensor 86 via the line 84. Accordingly, the difference of the set value and actual value of a parameter representing the crop throughput is present at the output of the second subtractor 94 and is sent to the input of an internal controller 96, which likewise can be designed in a substantially known way as a PID controller and preferably has a shorter time constant than the external controller 92, i.e., can react faster to changes of the input parameter. The external controller 92 outputs a set value for the drive speed as output value.

Said set value for the drive speed of the harvester 10 is sent as positive input value to a third subtractor 98, to which is sent, as negative input value, the actual drive speed of the harvester 10 that is registered by the speed sensor 90. The difference between the set and actual speed of the harvester 10 is sent to the input of another controller 100, which likewise can be designed in a substantially known way as a PID controller and preferably has a shorter time constant than the internal controller 96 and the output signals of which go to the control valves 104 via the line 82.

Accordingly, there are a total of three control loops in the control unit of FIG. 3. The internal control loop 108 can control an additional control loop 106, which can be supplied with an actual and a set value for the drive speed and which controls an actuator that affects the drive speed of the harvester, as described in European Patent Application No. EP 2 057 880 A2. The additional control loop 106 comprises the third subtractor 98, the additional controller 100, the control valves 104, and the speed sensor 90. This additional control loop 106 can thus be a speed control loop providing that the drive speed of the harvester 10 corresponds as well as possible with the set value of the drive speed that is present at the output of the internal controller 96. The innermost (additional) control loop could, as in European Patent Application No. EP 1 243 173 A1, even be omitted and the inner controller 96 could control the control valves 104 directly.

The crop throughput control loop, which comprises the second subtractor 94, the internal controller 96, the speed control loop described in the previous paragraph, and the hydraulic pressure sensor 86, can be seen as the internal control loop 108, which here controls the drive speed v of the harvester. Said crop throughput control loop provides that the actual value of the crop throughput-dependent parameter (i.e., the pressure at hydraulic pressure sensor 86, which represents the relevant crop throughput) corresponds as well as possible with the set value of the crop throughput-dependent parameter, which is present at the output of the external controller 92.

Finally, the drive power control loop, which comprises the first subtractor 48, the external controller 92, the crop throughput control loop described in the previous paragraph, and the components of the motor control unit 46, which makes available the signals concerning the power output of the combustion engine 42, can be viewed as an external control loop 110. Said drive power control loop provides that the actual value of the power of the combustion engine 42 corresponds as well as possible with the set value of the power of the combustion engine 42, as is specified through the operator input device 88 (or a higher level control).

When an internal control loop 108 is used, the external control loop 110 controls, as output parameter, a set value for a crop throughput-dependent parameter, which can be measured in any units, either as volume or weight throughput per unit time, or any other parameter that represents the crop throughput, such as a drive torque of a crop conveyor or processing unit or a deflection of an element that interacts with the crop such as, for example, the deflector plate of mass grain flow sensor. Further, the throughput-dependent parameter can be a pressure, and, in particular, can be registered using the pressure of an actuator for adjusting a belt variator of a drive of a crop conveyor and/or processing unit.

The set value for the crop throughput-dependent parameter is sent to the internal control loop 108, which in addition can be provided with a measured actual value of the crop throughput-dependent parameter. Using the two input parameters, the internal control loop 108 controls the drive speed of the harvester, directly or indirectly via an additional control loop 106.

This present disclosure expands the accordingly classic throughput control of a harvester in that the harvester speed is controlled and, in particular, the set value of the crop throughput is updated via the external control loop 110, so that the drive load can be adjusted to a desired set value, which can be preset, for example, by the operator or a higher-level control system. Thus, it is not the crop throughput-dependent parameter that serves as settable input parameter of the arrangement according to the present disclosure but rather the set value for the available drive power output which is provided, either via an operator or via a higher-level control system, which could, for example, be based on external specifications or economic considerations. This set value can be an absolute power output, which could be measured in kW, or a relative power output, which defines a (percent) fraction of an available drive power output. Thus, for example, it can be provided that the harvester is operated at 80% of the available net drive power output. The set value is sent to the external control loop 110. In addition, the current actual value of the power output of the harvester drive 60 is registered and sent to the external controller 92 or external control loop 110. The external controller 92 and/or control loop 110 controls the speed of the harvester via the drive speed controller of the harvester.

The set value for the available drive power output is considerably clearer than a crop throughput-dependent parameter and is thus more user friendly and can be input with lower probability of error. Moreover, the awkward and error-prone calibration of the crop throughput-dependent parameter by means of a crop loss or the like is omitted. By setting the desired set value for the drive power output, the operator is able to specify the desired utilization directly, which is considerably easier to understand and to manage. As a rule, the external control loop 110 is slower than the internal control loop 108.

Signals of a motor control unit of the combustion engine 42 of the drive 60 can be sent to the external control loop 110 as actual value for the power output of the drive 60, or power output values measured in other ways, which are as representative as possible for the power output (in all or for crop processing) of the combustion engine 42. Thus, the torque provided by the combustion engine 42 or the torque provided to an important part of the driven elements of the harvester (for example, crop conveyor and processing elements and possibly the drive elements) can be registered.

The motor control system is particularly suited to control the operation of the combustion engine 42 independent of the set value of the power output of the drive 60. For example, in this case, an isochronous regulation can be provided, i.e., the rotary speed of the combustion engine 42 remains the same at least up to a rated power output and can then decrease with increasing power output (see European Patent Application No. EP 2 253 822 A2, the disclosure of which is incorporated into the present documents by reference). It would also be possible, however, that the arrangement for control of the drive speed of the harvester sends the set value of the power output of the drive 60 to the motor control unit, which sets the operating point (rotary speed and power) of the combustion engine 42 to an optimum (for example, fuel efficient) operating point, independent of the set value of the power output.

If the harvester is a thresher or chopper, for example, and has an electric drive using a battery, a fuel cell, and/or a generator as power source, the power output of the drive could be measured directly, i.e., electrically, by registering all the powers output by the energy source through a single measurement or registering them at different measurement points and adding them together.

The internal control loop 108 and/or the external control loop 110 can additionally be provided with an external correcting variable, which can be employed to reduce the drive speed. The external correcting variable can, in particular, be an exceeding of a threshold value of the drive power output. In the case of high loads, there is the danger of overloading the drive 60 and blockage of the machine through the (as noted, slower) external loop. Said problem can be avoided by taking into account the external correcting variable, which, in the case of high loads, switches on a direct speed regulation (reduction), for example in dependence on a measured rotary speed drop below the rated rotary speed of the drive 60 or a power output exceeding a threshold value. In this way, the regulation keeps the operating point on the power curve of the combustion engine stable in the region between rated and maximum power.

Through the drive power control loop, which was added to the substantially known crop throughput control loop, it is considerably easier for the operator to input a meaningful specification for the operation of the harvester 10, since the power is considerably clearer than a throughput or a value dependent thereon.

As already described, the external control loop (drive power control loop) is slower than the internal control loop (crop throughout control loop). To keep blockage of the harvester 10 from occurring if there are higher throughputs, the internal control loop and/or the innermost (additional) control loop are sent, through a drive speed reducer 102, still another external correcting parameter, which, when actuated, acts to reduce the drive speed and the throughput. This external correcting variable becomes active when the power of the combustion engine 42, which is likewise sent to the drive speed reducer 102 via the motor control unit 46, exceeds a threshold value, which can correspond, for example, to its rated power. Through this, one avoids, in cases of unfavorable operating situations, to which the external control loop and even possibly the internal control loop cannot react in a timely way, slippage or blockage of the harvester 10. Specifically, the speed reduction brought about by the drive speed reducer 102 (after exceeding the rated power output) can be proportional to the decrease of the rotary speed from the rated rotary speed. In this regard, one is referred to curve 48 of FIG. 2 in European Patent Application No. EP 2 253 822 A1.

It follows from the figures that the control unit 80 controls the output power of the combustion engine 42 only through the control of the drive speed v of the harvester 10, but not through a specification to the motor control unit 46 to make available a certain power output. The power output by combustion engine 42 rather results indirectly through the load of the harvester 10 with crop. However, in another embodiment, it would be conceivable that the control unit 80 provides the motor control unit 46 with a signal regarding the desired motor power output in each case, so that the motor control unit 46 can set an optimal operating point of the combustion engine 42.

Finally, it should be noted that the internal control loop 108 could be omitted. The external controller 92 would then directly control the drive speed v, either (if the innermost (additional) control loop 106 is omitted) through direct control of the control valves 104 or through specification of a set value of the drive speed v to the innermost (additional) control loop 106. Such an arrangement can be useful in the case of harvesters 10 in the form of field choppers, in which the crop throughput can be determined only with difficulty. The correcting variable of the drive speed reducer 102 would then be taken directly from the specification of the drive speed.

Having described one or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The invention claimed is:

1. An arrangement for controlling a propulsion speed of a harvester, the arrangement comprising:
   an electronic controller configured to control the propulsion speed of the harvester,
   wherein the electronic controller includes an outer control loop operating at a first cycle time duration and an inner control loop operating at a second cycle time duration shorter than the first cycle time duration,
   wherein the outer control loop is configured to control the propulsion speed of the harvester, such that a desired power value and an actual power value with respect to power of an internal combustion engine for driving the harvester are supplied as input variables to the outer control loop,
   wherein the inner control loop is supplied with a desired variable value and an actual variable value of a throughput-dependent variable from the outer control loop, and
   wherein the electronic controller is configured to control the propulsion speed of the harvester such that the actual power value coincides with the desired power value.

2. The arrangement as defined in claim 1, wherein the throughput-dependent variable is a pressure and is detected with reference to the pressure of an actuator for adjusting a belt variator of a crop-conveying device and/or a crop-processing device.

3. The arrangement as defined in claim 1, wherein signals of a motor controller of the internal combustion engine are supplied to the outer control loop as the actual power value.

4. The arrangement as defined in claim 3, wherein the motor controller is to control operation of the internal combustion engine independently of the desired power value.

5. The arrangement as defined in claim 1, wherein the desired power value is inputted by an operator.

6. The arrangement as defined in claim 1,
   wherein the electronic controller further includes a further control loop,
   wherein the inner control loop is configured to control the further control loop, and
   wherein the further control loop is provided with an actual propulsion speed value and a desired propulsion speed value for the propulsion speed of the harvester, and controls an actuator influencing the propulsion speed of the harvester.

7. The arrangement as defined in claim 6, wherein an external actuating variable used to reduce the propulsion speed of the harvester is supplied to the inner control loop and/or the further control loop.

8. The arrangement as defined in claim 7, wherein the external actuating variable represents an exceeding of a threshold value of the power of the internal combustion engine.

9. The arrangement as defined in claim 1,
   wherein the electronic controller further includes a further control loop configured to control an actuator influencing the propulsion speed of the harvester,
   wherein the further control loop is controlled by the inner control loop, and
   wherein the further control loop operates at a third cycle time duration that is shorter than the second cycle time duration.

10. A system for controlling a propulsion speed of a harvester, the system comprising:
an internal combustion engine;
a drive operatively coupled to the internal combustion engine; and
an electronic controller configured to control the propulsion speed of the harvester via the drive,
wherein the electronic controller includes an outer control loop operating at a first cycle time duration and an inner control loop operating at a second cycle time duration shorter than the first cycle time duration,
wherein the outer control loop is configured to control the propulsion speed of the harvester, such that a desired power value and an actual power value with respect to power of the internal combustion engine for driving the harvester are supplied as input variables to the outer control loop,
wherein the inner control loop is supplied with a desired variable value and an actual variable value of a throughput-dependent variable from the outer control loop, and
wherein the electronic controller is configured to control the propulsion speed of the harvester such that the actual power value coincides with the desired power value.

11. The system as defined in claim 10, wherein the throughput-dependent variable is a pressure and is to be detected with reference to the pressure of an actuator for adjusting a belt variator of a crop-conveying device and/or a crop-processing device.

12. The system as defined in claim 10, wherein signals of a motor controller of the internal combustion engine are supplied to the outer control loop as the actual power value.

13. The system as defined in claim 12, wherein the motor controller is to control operation of the internal combustion engine independently of the desired power value.

14. The system as defined in claim 10, wherein the desired power value is to be inputted by an operator.

15. The system as defined in claim 10,
wherein the electronic controller further includes a further control loop,
wherein the inner control loop is configured to control the further control loop, and
wherein the further control loop is provided with an actual propulsion speed value and a desired propulsion speed value for the propulsion speed of the harvester, and controls an actuator influencing the propulsion speed of the harvester.

16. The system as defined in claim 15, wherein an external actuating variable used to reduce the propulsion speed of the harvester is supplied to the inner control loop and/or the further control loop.

17. The system as defined in claim 16, wherein the external actuating variable represents an exceeding of a threshold value of the power of the internal combustion engine.

18. A method for controlling a propulsion speed of a harvester, the method comprising:
providing a desired power value and an actual power value of power of an internal combustion engine of the harvester as input variables to an outer control loop of an electronic controller;
providing a desired variable value and an actual variable value of a throughput-dependent variable from the outer control loop to an inner control loop of the electronic controller, wherein the outer control loop operates at a first cycle time duration and the inner control loop operates at a second cycle time duration shorter than the first cycle time duration; and
controlling the propulsion speed of the harvester such that the actual power value coincides with the desired power value.

19. The method as defined in claim 18, wherein the throughput-dependent variable is a pressure and is detected with reference to the pressure of an actuator for adjusting a belt variator of a crop-conveying device and/or a crop-processing device.

20. The method as defined in 18, further including providing signals of a motor controller of the internal combustion engine of a drive to the outer control loop as the actual power value.

21. The method as defined in claim 20, wherein the controlling of the internal combustion engine by the motor controller occurs independently of the desired power value.

22. The method as defined in claim 18, wherein the desired power value is inputted by an operator.

23. The method as defined in claim 18, further including controlling, by the inner control loop, a further control loop by:
providing an actual propulsion speed value and a desired propulsion speed value for the propulsion speed of the harvester to the further control loop, and
controlling an actuator influencing the propulsion speed of the harvester.

24. The method as defined in claim 23, further including providing an external actuating variable to the inner control loop and/or the further control loop used to reduce the propulsion speed of the harvester.

25. The method as defined in claim 24, wherein the external actuating variable represents an exceeding of a threshold value of the power of the drive internal combustion engine.

* * * * *

UNITED STATES PATENT AND TRADEMARK OFFICE
CERTIFICATE OF CORRECTION

PATENT NO. : 11,987,120 B2
APPLICATION NO. : 17/387691
DATED : May 21, 2024
INVENTOR(S) : Muench It is certified that error appears in the above-identified patent and that said Letters Patent is hereby corrected as shown below:

In the Claims

On Column 9, Claim 11, Line 27, Delete "to be".

On Column 9, Claim 14, Line 38, Delete "to be".

Signed and Sealed this
Nineteenth Day of November, 2024

Katherine Kelly Vidal
*Director of the United States Patent and Trademark Office*